Patented May 26, 1931

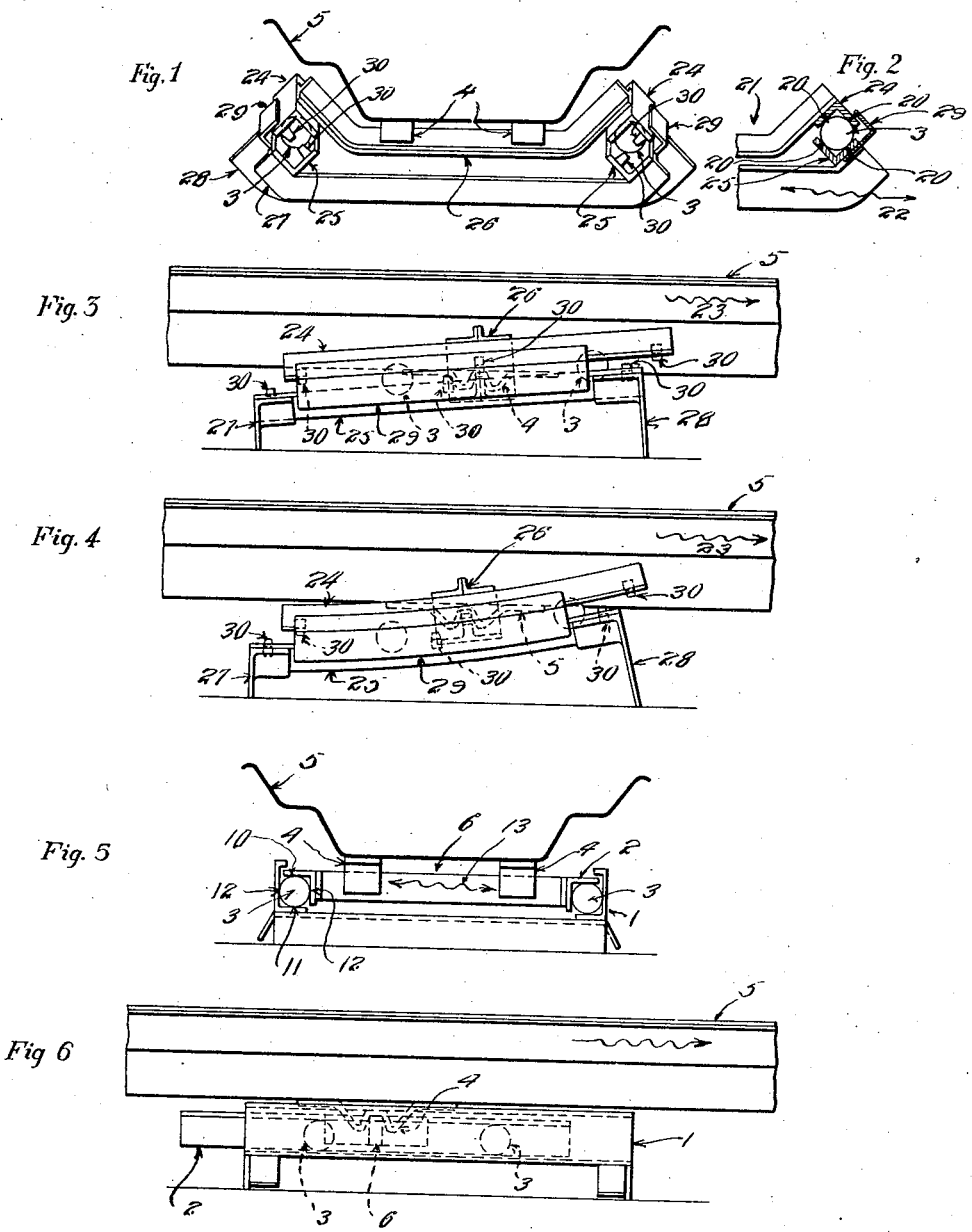

1,807,110

UNITED STATES PATENT OFFICE

RAYMOND A. WALTER, OF NEW YORK, N. Y., ASSIGNOR TO CONVEYOR SALES COMPANY, OF NEW YORK, N. Y., A CORPORATION OF NEW YORK

CARRIER SUPPORT FOR RECIPROCATING CONVEYERS

Application filed June 11, 1927. Serial No. 198,116.

This invention relates in general to supporting structures and more particularly has reference to a carrier support for a reciprocating conveyer.

Previous to this time reciprocating conveyers, otherwise known in the art as shaking or jigging conveyers, composed of a series of troughs secured together to make up any desired length, have been supported at suitable intervals by mechanisms constructed to permit the troughs constituting the conveyer to be reciprocated backward and forward. Among such mechanisms that have been improvised to meet the particular requirements are wheels journaled on axles, free rollers, ball bearing rollers and suspension chains.

One type of supporting structure has been designed to take part in producing the accelerated and retarded reciprocation of the troughs constituting efficient conveyer operation, while the other types have simply consisted of a rolling or swinging support, placing the entire burden of operation on the driving engine.

The most efficient carrier support that has been developed up to this time is the ball bearing type. This has not been highly satisfactory however as its present assembly has given rise to considerable sliding friction, detracting from the efficiency of the conveyer by reason of certain fundamental details in construction to be hereinafter more fully described.

An object of this invention is to provide a carrier support for a reciprocating conveyer adapted to eliminate sliding friction irrespective of positioning.

Another object of this invention is to provide a carrier support for a reciprocating conveyer designed to assist in producing the accelerated and retarded reciprocation constituting efficient conveyer operation.

A still further object of this invention is to provide a carrier support for a reciprocating conveyer adapted to operate in a minimum of head room.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification,

Figure 1 is a front perspective view of the carrier support forming the subject matter of this invention;

Fig. 2 is a front elevation sectional view of the carrier support mounting showing the conveyer and carrier supports partly broken away;

Fig. 3 is a side elevation detailed view of the carrier support;

Fig. 4 is a side elevation detailed view, showing a modification of Fig. 3;

Fig. 5 is a front elevation of a conventional ball bearing carrier support;

Fig. 6 is a side elevational detailed view of the support shown in Fig. 5.

Referring by numerals to the drawings wherein the same and similar elements are designated by like symbols of reference throughout and more particularly to Figure 5 there is shown a conventional ball bearing carrier support heretofore in use with reciprocating conveyers employed in mines and for various other industrial uses.

This support comprises a ball race frame work 1 composed of suitable structural steel shapes adapted to be placed on a floor or any other suitable conveyer foundation. An upper frame 2 is adapted to slide back and forth with respect to the lower frame on ball bearings 3. Suitable brackets 4 are riveted to the bottom of a conveyer trough 5 and engaging a cross piece 6 rigidly mounted on the upper frame 2.

When the conveyer 5 is reciprocated, the brackets 4 engaged on the cross piece 6, reciprocate the upper frame 2 on the ball bearings 3. The direction of transport for the material in the conveyer is indicated by the arrow on the conveyer trough shown in Figure 6. While this type of carrier support is more efficient than the various other types of supports not employing ball bearings, it embodies certain fundamental defects and disadvantages that the improvements effected in this invention seek to overcome.

When the upper frame 2 is reciprocating back and forth on the ball bearings 3 with respect to the lower frame 1, as shown in Fig. 5, as a vertical force is exerted, there is a rolling friction between the ball bearings 3 and the top frame 2 at the point 10 and a similar friction between the ball bearings and the lower frame 1 at the point 11. This rolling friction at points 10 and 11 obviously cannot be eliminated and is appreciably less than the friction encountered on any other form of support heretofore developed, except the suspended type. When the ball bearings 3 roll back and forth maintaining a rolling contact on the top frame 2 and the bottom frame 1 at points 10 and 11, the sides of the balls at points 12 must move back and forth progressively with and in relation to the top frame. This gives rise to an objectionable sliding friction that causes excess wear and develops appreciable power losses.

If the bottom frame 1 is positioned absolutely level and the conveyer troughs 5 set up in perfect alignment with each other and with the length-wise axes of the frame 1, the sliding friction will not be present to a damaging degree. In practice, however, these conditions seldom obtain as the bottom frames 1 are usually not accurately leveled and are sometimes inclined side-wise to an appreciable extent, causing a wide variation in the alignment and level of the individual trough units. These two factors combine to create side thrusts in the direction of the double-headed arrow 13 as shown in Figure 5, causing a heavy sliding friction at the points 12 on the ball bearings at the points where the thrusts occur.

There is shown in Figures 1, 2 and 3 a carrier support forming the subject matter of this invention designed to eliminate the undesirable sliding friction detracting from the efficiency of the structure embodied in the previous ball bearing carrier supports hereinbefore described.

The conventional conveyer trough 5 is mounted on the novel support by brackets 4 riveted to the bottom. The support is preferably composed of structural steel shapes although it may be fabricated of machined metal parts or constructed in any other desirable manner. The trough 5 is supported by the brackets 4 on a cross piece 26, preferably formed of a T-beam bent upwardly at each end to form an angle of 45° with the horizontal. A plurality of L-beams adapted to act as ball races are downwardly mounted on the outside of the upwardly bent ends of the T-beam cross piece, by any suitable means so that the sides also form angles of 45° with the horizontal.

The ball bearings 3 are seated in a similar L-beam race 25 mounted at angles of 45° on forward and rear supporting frames 27 and 28 having supporting legs varying in height. The supporting frames 27 and 28 are formed of angle irons bent upwardly at each end at an angle of 45°. Two flanged irons 29 are mounted on end to the lower race 25 to overlap the upper race 24, and prevent the disengagement of the two races. A plurality of lugs 30 are seated in the respective ends of the races 24 and 25 to retain the balls 3 in position and prevent them from falling out of the support. The bottom race 25 is further provided with a series of apertures, not shown, to permit any refuse entering the race, that may retard the function of the balls to fall out or be removed.

The balls have a purely rolling contact on the four points 20. Vertical loads in the direction of the arrow 21 or horizontal forces in the direction of either of the points of the double headed arrow 22 as shown in Figure 2 will not change the normal functioning of the balls, as the contact is always a rolling one on the four points 20.

It is to be understood that this invention is not confined to this particular construction as it may readily be perceived that a three point contact may be desirable, and easily obtained by substituting a flat ball race in place of either of the upper or lower angle races 24 or 25 in any manner so that the conveyer exerts a horizontal force on the support.

The reciprocation in the direction of transport of the material as indicated by the arrow 23 in Figure 3 is known as the forward stroke. The return reciprocation against the direction of transport of the material being conveyed is known as the backward stroke. As described in my copending application Serial No. 173,136, filed March 5, 1927, successful operation of a reciprocating conveyer is dependent upon building up kinetic energy in the material during the forward stroke which will overcome the coefficient of friction of the material sufficiently to permit it to slide forward during the backward stroke of the conveyer. This result is best attained by starting the conveyer on its forward stroke very slowly and constantly accelerating through the major portion of the forward stroke until it attains its highest velocity shortly before the reversal to the backward stroke. The conveyer is then quickly brought to a full stop and immediately reversed. The backward stroke should be exactly the reverse of the forward stroke and should attain its highest velocity at the very beginning and gradually slow down until it reaches zero motion at its end.

The forward stroke of the conveyer should be so proportioned that while it is accelerating it does not gain velocity so rapidly as to overcome the coefficient of friction of the material being conveyed. If the motion is properly regulated the material moves forward with the conveyer on the forward stroke and gradually builds up kinetic energy to such a point that when the conveyer is suddenly brought to a stop and instantly reversed at the end of the forward stroke the kinetic energy is sufficient to overcome the friction between the material and the conveyer trough. The energy thus contained in the material makes it slide forward and causes the forward motion to be emphasized or increased by the rapid withdrawal of the conveyer from underneath the material on the backward stroke.

With the old type of support shown in Figures 5 and 6 the movement of the conveyer being entirely in a horizontal plane, no differences in pressure occur between the material and the trough at any point in the stroke, making it necessary to overcome the resistance of friction entirely by the action of the motor.

In this invention, as shown in Figures 3 and 4, the carrier support is inclined to impart a lifting motion and cause the conveyer trough to press more firmly against the material during the forward stroke and temporarily increase the friction between the material and the trough. This allows the conveyer to attain a more rapid start on its forward stroke, without any resultant slippage, than can be accomplished when the stroke is entirely in a horizontal plane.

When the conveyer moves forward on an inclined forward stroke at a constantly increasing speed a definite upward impulse is given to the material by reason of the inclined forward motion of the upper frame and the trough. When the conveyer is stopped at the end of the forward stroke and suddenly reversed the trough momentarily tends to fall away from the material which still has a tendency to move upward and the friction between the material and the trough is decreased at the proper moment. The decrease in friction at the end of the forward stroke permits the kinetic energy in the material to move it forward a greater distance before the friction between the material and the trough absorbs all the contained energy. The length of the legs of the supports 27 and 28 may be regulated according to the positioning of the conveyer. If the troughs are situated on a falling grade or where low capacities only are desired, the front and rear supports 27 and 28 may be of the same length, but where higher capacities or more efficient operation is deemed suitable, the front cross leg 28 may be constructed higher as shown in Fig. 3.

The rear support 27 may be reversed so that the rear of the ball races 25 may rest directly on the foundation supporting structure, allowing a lower assembly and still preserving the same inclination of the support by forming the front cross support 28 of proper length.

If the conditions effecting transport are especially adverse, giving rise to a need for a greater decrease in friction at the end of the forward stroke of the conveyer, this result may be simply obtained by building a race radially as shown in Figure 4. In this structure the upper and lower ball races 24 and 25 are concentrically curved and mounted in parallel relation.

It may readily be perceived that the upward pitch between the forward end of the upper race 24 and the conveyer trough 5 is appreciably greater in Figure 4 than the pitch on the end of the flat inclined plane as shown in Fig. 3. The increased pitch causes an additional upward or pressing effect between the trough and the material, increasing the adhesion proportionately on the upward stroke so that the drop of the trough from the material on the reversal to the backward stroke will be increased in like proportion, additionally facilitating transport by increasing and decreasing the friction of the material and the trough at the proper moment.

The operation of this invention may be readily understood having reference to Figures 1, 3 and 4. The ball races 24 and 25 positioned at a 45° angle to the horizontal of the cross piece 26 and the cross pieces 27 and 28 and receiving a vertical force from the conveyer, afford a perfect four point rolling contact to the bearings 3 for backward and forward reciprocation without any shearing stresses. The inclination of the supports permits an exceedingly strong and satisfactory connection between the cross members 26, 27 and 28 and allows a low assembly of the conveyer on the bent cross piece 26. The height of the assembly or the inclination of the support may be regulated by varying the length of the cross supporting legs 27 and 28, or the rear of the support may rest directly on the foundation, if so desired, to attain the lowest possible assembly by reversing the position of the supporting leg 27.

The inclination shown in Figure 3 permits the conveyer to assist in attaining the proper reciprocation imparted by the driving motor and which may be accentuated by employing a radial carriage as shown in Figure 4.

There is accomplished by this invention a novel carrier support for a reciprocating conveyer eliminating sliding friction irrespective of the positioning of the conveyer and assisting in producing the accelerated and retarded reciprocation constituting efficient conveyer operation in a minimum of head room.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A carrier support for a reciprocating conveyer comprising flanged support members having upturned ends, angular bottom ball races mounted on the sides of the upturned ends, ball bearings seated in the bottom races, angular top races on the ball bearings and a flanged support member having upturned ends mounted on the conveyer, the upturned ends being mounted on the angular top races.

2. A carrier support for a reciprocating conveyer comprising flanged support members having upturned ends, angular bottom races mounted on the sides of the upturned ends of the support members, ball bearings seated in the bottom races, angular top races mounted on the ball bearings, means to mount the conveyer on the top races and means to retain the top and bottom races in position.

In testimony whereof I affix my signature.

RAYMOND A. WALTER.